(12) United States Patent
Wentworth

(10) Patent No.: US 7,671,890 B2
(45) Date of Patent: Mar. 2, 2010

(54) ROVING CAMERA SECURITY SYSTEM

(75) Inventor: Edwin W. Wentworth, Dale City, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1657 days.

(21) Appl. No.: 10/830,464

(22) Filed: Apr. 23, 2004

(65) Prior Publication Data

US 2005/0237387 A1    Oct. 27, 2005

(51) Int. Cl.
    *H04N 7/18* (2006.01)
(52) U.S. Cl. .......................... 348/151; 348/143
(58) Field of Classification Search .......... 348/142–160
    See application file for complete search history.

(56) References Cited

U.S. PATENT DOCUMENTS

| 4,027,329 | A | * | 5/1977 | Coutta | 348/150 |
| 4,777,527 | A | * | 10/1988 | Camps et al. | 348/143 |
| 5,225,863 | A | * | 7/1993 | Weir-Jones | 396/56 |
| 5,241,380 | A | * | 8/1993 | Benson et al. | 348/143 |

* cited by examiner

*Primary Examiner*—Andy S Rao
(74) *Attorney, Agent, or Firm*—Richard J. Kim; John H. Raubitschek

(57) ABSTRACT

A covert all-weather roving camera security system includes a monorail track, at least one self-propelled trolley able to move itself back and forth continuously along the monorail track, and a plurality of surveillance cameras attached to the trolley. A housing completely encloses the monorail track and the trolley and has a sunshield on its top to protect the cameras from overheating and a filtered window on its sides and bottom to prevent human eyes from seeing in the housing while permitting the cameras to see out.

20 Claims, 2 Drawing Sheets

ROVING CAMERA SECURITY SYSTEM

GOVERNMENT INTEREST

The invention described herein may be manufactured, used, sold, imported, and/or licensed by or for the Government of the United States of America.

FIELD OF INTEREST

This invention relates in general to security systems, and more particularly, to security camera systems.

BACKGROUND OF THE INVENTION

Security camera installations are known in which stationary cameras are placed every 50 meters or so along a fenced perimeter to patrol the perimeter. In such systems, it is costly to provide the infrastructure and power cable to accommodate a lengthy perimeter. Also, because the cameras are stationary, there may be blind spots along the perimeter where corners are turned and the fence goes up and down hills. Another drawback is that the cameras are positioned to look down the fence line. If conventional chain link fencing is used, as the cameras look down the fence line the chain link mesh obstructs the line of sight. In addition, if the perimeter is heavily wooded, as the cameras look down the fence line they may fail to detect intruders who would clearly stand out if the fence were viewed head on.

SUMMARY OF THE INVENTION

It is therefore an object of this invention to improve the patrolling of a perimeter.

This and other objects of the invention are achieved in one aspect by a covert all-weather roving camera security system comprising a monorail track, at least one self-propelled trolley able to move itself back and forth continuously along the monorail track, and a plurality of surveillance cameras attached to the trolley. A housing completely encloses the monorail track and the trolley. The housing has a sunshield on its top to protect the cameras from overheating and a filtered window on its sides and bottom to prevent human eyes from seeing in the housing while permitting the cameras to see out.

Another aspect of the invention involves a covert all-weather roving camera security method comprising the steps of providing a monorail track, propelling a trolley back and forth continuously along the monorail track, televising images with a plurality of surveillance cameras attached to the trolley, protecting the cameras from overheating, and preventing human eyes from seeing the cameras.

There are advantages to the roving camera security system that one cannot get from stationary camera systems.

First, the roving camera security system is a "terrain following" system, and therefore there are no blind spots along the perimeter. The monorail turns corners with the perimeter fence line and goes up and down hills following the terrain.

Second, the system may be modular in form and assembled like a toy train track to meet the terrain requirements. All of the power and fiber cables can be embedded into the housing that encloses the monorail track and trolley. There is no need to dig trenches for laying fiber optic and power cables.

Third, a small number of roving trolleys can do the same work as the large number of stationary cameras required for a stationary camera system.

Finally, since the roving camera security system is installed parallel to the fence, the camera system looks at the fence head on, instead of looking down the fence line.

Additional advantages and features will become apparent as the subject invention becomes better understood by reference to the following detailed description when considered in conjunction with the accompanying drawings wherein:

DETAILED DESCRIPTION OF THE INVENTION

Figure 1:
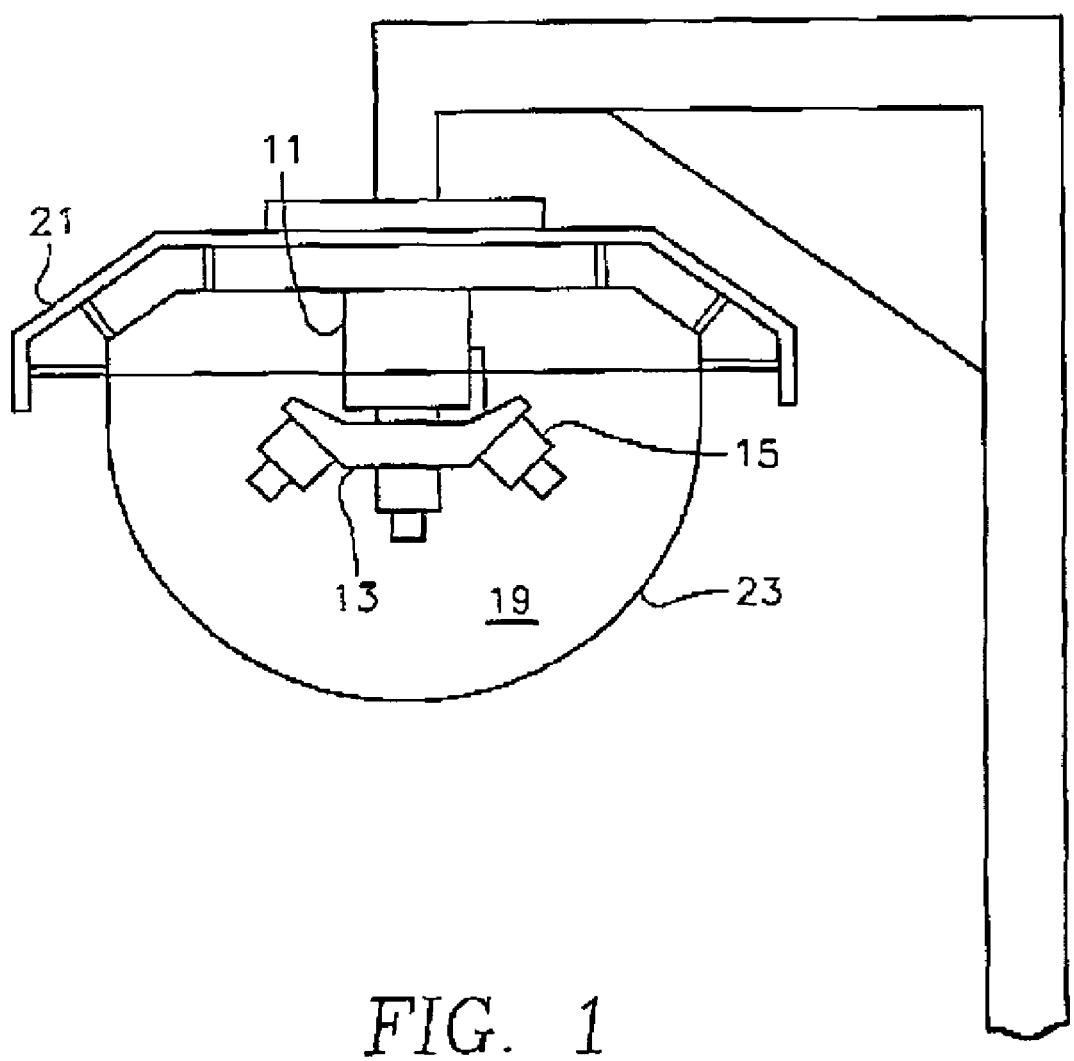
FIG. 1 is a schematic illustration of a security system embodying the invention.
Figure 2:
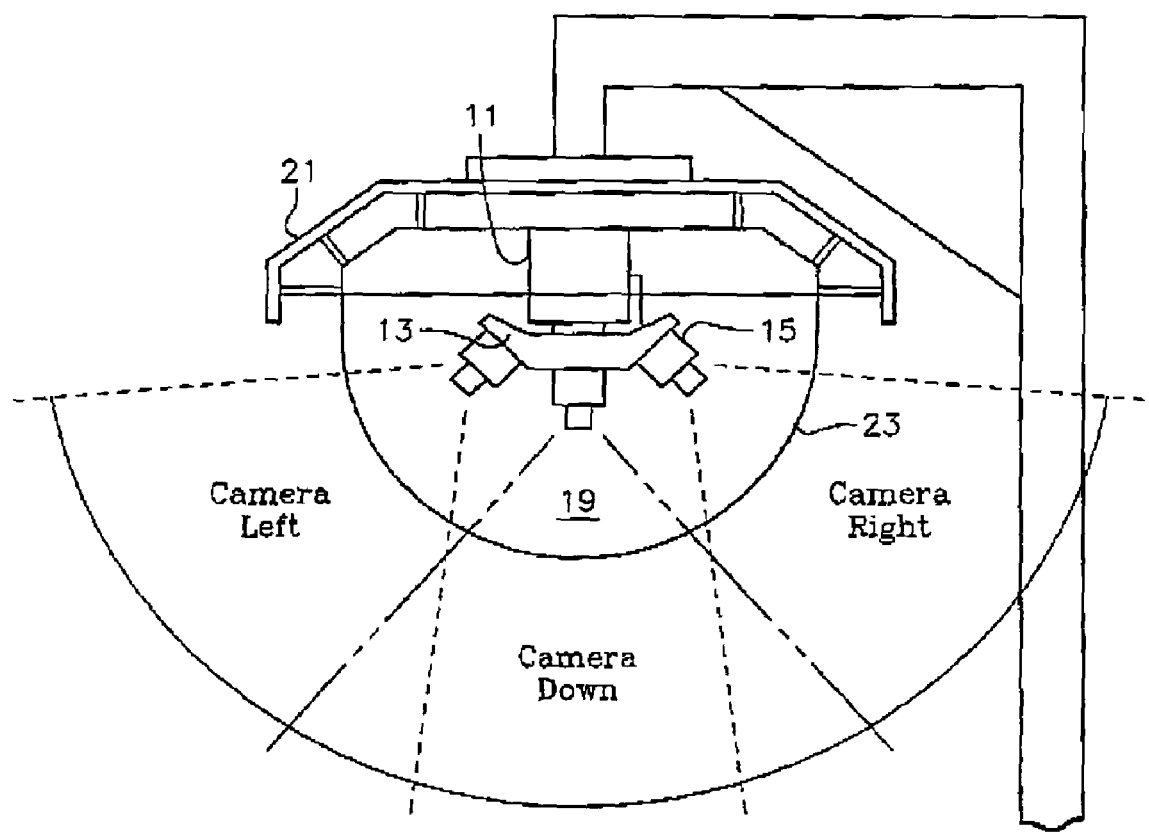
FIG. 2 shows camera direction and field of view.

Referring now to FIGS. 1-2, wherein like reference numerals designate like or corresponding parts, FIG. 1 shows the covert all-weather roving camera security system. The security system includes an elevated monorail track 11, which runs along the facility perimeter to be monitored, and one or more self-propelled trolleys 13 able to move themselves back and forth continuously along the monorail track. Each trolley 13 can cover a small area or perform a patrol of the entire perimeter. Four high-speed CCD video surveillance cameras 15 are attached to the trolley 13 to televise images of the perimeter. As shown in FIG. 2, the four camera positions are downward front, downward back, left and right sides. This arrangement provides the most imagery coverage to ensure detection of an intruder.

A housing 19 completely encloses the monorail track 11 and the trolleys 13. The housing 19 has a sunshield 21 on top to protect the cameras from overheating and to protect it from rain, hail and snow. The sunshield may be provided with solar cells (not shown) for powering the security system. Alternatively, wind generators can power the security system. The housing 19 has a near infrared-filtered window 23 on its sides and bottom to prevent human eyes from seeing in the housing, while permitting the cameras to look out. This makes the security system covert in operation. It also protects the security system from harsh weather elements, reducing the possibility of equipment failure.

The housing 19 can contain a plurality of fiber-optic cables for sending images from the cameras to an external control center. It can also contain a plurality of electrical cables for transmitting electricity to the trolleys 13 by way of the rail of the monorail track 11. A laser may be provided to download the video imagery to the rail of the monorail track 11 and pass it to an image processor for processing and transmittal to the control center over the fiber-optic cables contained in the housing 19.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A covert all-weather roving camera security system comprising:
   a monorail track;
   at least one self-propelled trolley able to move itself back and forth continuously along the monorail track;
   a plurality of surveillance cameras attached to the trolley; and
   a housing completely enclosing the monorail track and the trolley and having a sunshield on its top to protect the cameras from overheating and a filtered window on its sides and bottom to prevent human eyes from seeing in the housing while permitting the cameras to see out.

2. The system recited in claim 1 wherein the cameras are video cameras.

3. The system recited in claim 2 wherein the cameras are CCD cameras.

4. The system recited in claim 3 wherein the cameras are high-speed cameras.

5. The system recited in claim 3 wherein the filtered window is a near-infrared filtered window.

6. The system recited in claim 1 wherein the cameras are four in number.

7. The system recited in claim 1 wherein the position of one camera is downward front.

8. The system recited in claim 1 wherein the position of one camera is downward back.

9. The system recited in claim 1 wherein the position of one camera is to the left side.

10. The system recited in claim 1 wherein the position of one camera is to the right side.

11. A covert all-weather security camera system for patrolling a facility perimeter comprising:
   a monorail track;
   at least one self-propelled trolley able to move itself back and forth continuously along the monorail track;
   four high speed CCD video surveillance cameras attached to the trolley, wherein the positions of the cameras are downward front, downward back, left side and right side; and
   a housing completely enclosing the monorail track and the trolley and having a sunshield on its top to protect the cameras from overheating and a near infrared-filtered window on its sides and bottom to prevent human eyes from seeing in the housing while permitting the cameras to see out.

12. A covert all-weather roving camera security method comprising the steps of:
   providing a monorail track with a housing;
   propelling a trolley back and forth continuously along the monorail track;
   televising images with a plurality of surveillance cameras attached to the trolley;
   protecting the cameras from overheating by providing a sunshield on top of the housing; and
   preventing human eyes from seeing the cameras by providing at least one filtered window with the housing.

13. The method recited in claim 12 wherein the images are televised with a plurality of video cameras.

14. The method recited in claim 13 wherein the images are televised with a plurality of CCD cameras.

15. The method recited in claim 14 wherein the images are televised with a plurality of high speed cameras.

16. The method recited in claim 14 wherein the at least one filtered window is a near infrared filtered window.

17. The method recited in claim 12 wherein the images are televised by a camera whose position is downward front.

18. The method recited in claim 12 wherein the images are televised by a camera whose position is downward back.

19. The method recited in claim 12 wherein the images are televised by a camera whose position is to the left side.

20. The method recited in claim 12 wherein the images are televised by a camera whose position is to the right side.

* * * * *